March 17, 1942.  A. G. COOLEY  2,276,936
COMPOSITE ELECTRIC MOTOR
Filed Nov. 28, 1939  3 Sheets-Sheet 1
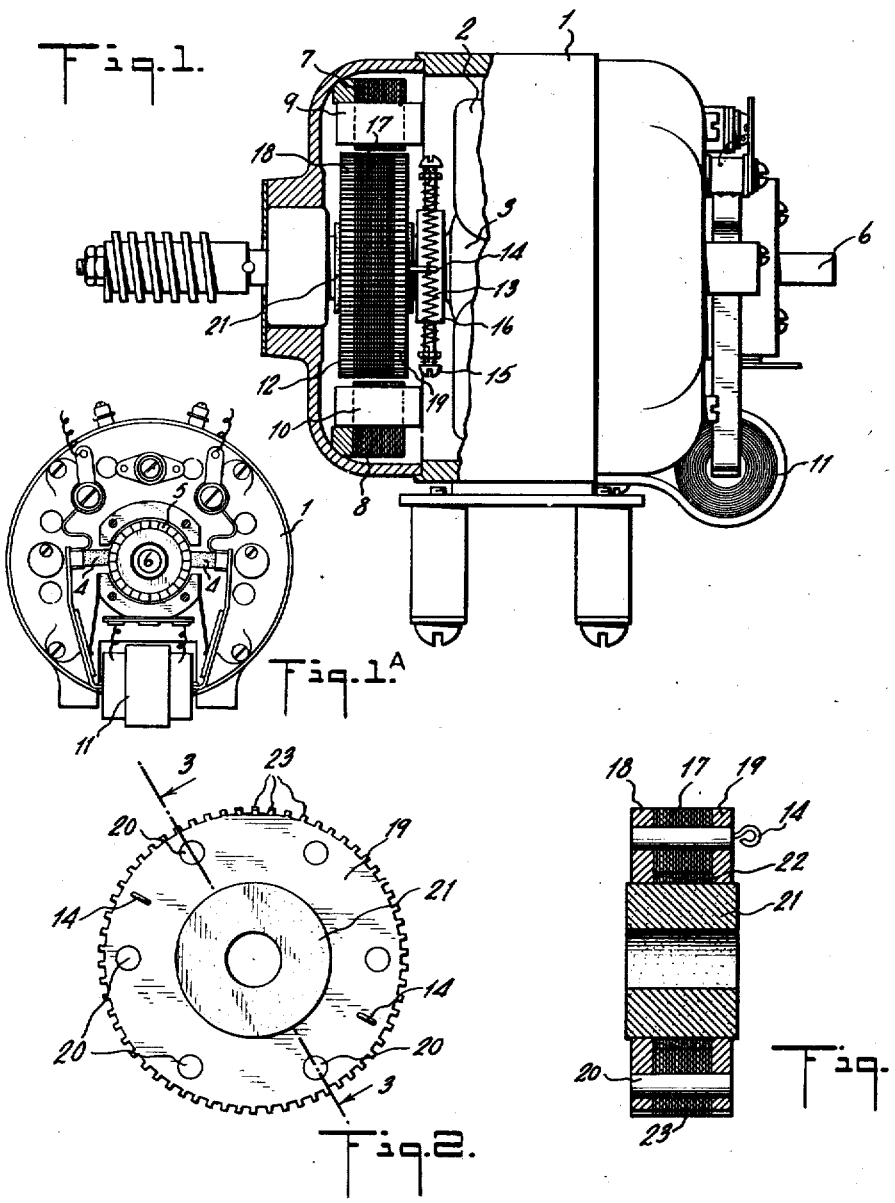

March 17, 1942.  A. G. COOLEY  2,276,936
COMPOSITE ELECTRIC MOTOR
Filed Nov. 28, 1939  3 Sheets-Sheet 2
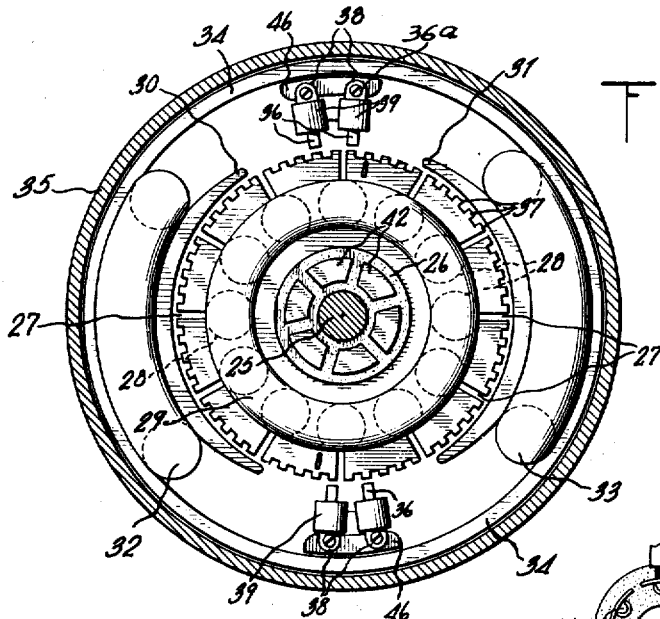
Fig. 4.
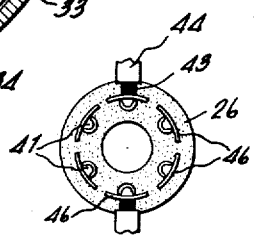
Fig. 6.A
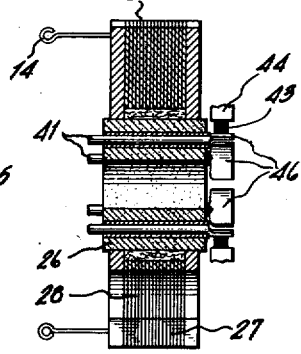
Fig. 5.
Fig. 6.
Austin G. Cooley
INVENTOR.
BY John J. Rogan
ATTORNEY.

March 17, 1942. A. G. COOLEY 2,276,936
COMPOSITE ELECTRIC MOTOR
Filed Nov. 28, 1939 3 Sheets-Sheet 3

Austin G. Cooley
INVENTOR.

BY John J. Logan
ATTORNEY.

Patented Mar. 17, 1942 2,276,936

UNITED STATES PATENT OFFICE 2,276,936

COMPOSITE ELECTRIC MOTOR

Austin G. Cooley, Hudson View Gardens, N. Y., assignor, by mesne assignments, to Times Telephoto Equipment Inc., New York, N. Y., a corporation of New York Application November 28, 1939, Serial No. 306,464

3 Claims. (Cl. 172—36)

This invention relates to electric motors and more especially to motors of the composite type, that is, having a plurality of sections each performing a different function.

The invention is in the nature of an improvement on the composite electric motor disclosed in application Serial No. 299,955, filed October 18, 1939.

A principal object is to provide an improved composite electric motor of the fractional horsepower type.

Another object is to provide an improved motor of the fractional horse-power type having a synchronous rotor and asynchronous rotor.

Another object is to provide an improved rotor for a phonic-wheel motor.

A further object is to provide a composite rotor for a composite motor, the rotor being constructed to act both as an induction type and as a phonic-wheel type rotor.

A further object is to provide a composite stator for a composite motor, the stator being constructed and wound to act both as an induction motor stator and as a phonic-wheel motor stator.

Another feature relates to an improved composite motor for use in driving remotely controlled mechanisms such as tele-facsimile machines, telegraph machines and the like.

A still further feature relates to the novel organization, arrangement and relative location of parts which constitute an improved and highly efficient composite driving rotor of the fractional horse-power type. In the drawing which illustrates different embodiments of the invention, Fig. 1 is an elevation view, partly sectional of a composite motor embodying features of the invention.

Fig. 1A is an end view of Fig. 1.

Fig. 2 is an end view of the toothed-wheel rotor of Fig. 1.

Fig. 3 is a sectional view of Fig. 2 taken along the line 3—3 thereof.

Fig. 4 shows a modification of the motor of Fig. 1.

Fig. 5 is another view of Fig. 4 with the casing partly broken away to show the internal arrangement more clearly.

Fig. 6 is a modification of the rotor and commutator arrangement of Figs. 4 and 5.

Fig. 6A is an end view of the commutator of Fig. 6.

Figure 7:
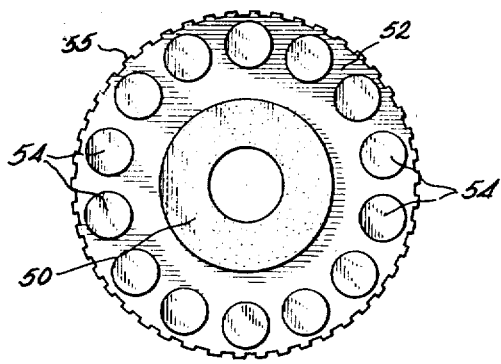
Fig. 7 is another modification of the rotor of Figs. 4 and 5 as embodied in a squirrel-cage type induction motor rotor.

In certain of the arts, e. g., tele-facsimile transmission, telegraphy and the like, it is necessary to drive remotely located members in synchronism under control of transmitted synchronizing signals. In one known type of tele-facsimile system, for example as shown in Patent No. 2,015,742, the facsimile signals are transmitted in the form of a modulated audio frequency carrier current of relatively high frequency as compared with ordinary commercial A. C. supply frequencies. Thus the tele-facsimile signals may be transmitted at a frequency of 1800 C. P. S. and the 1800 cycle component or carrier is used at the receiving station, after suitable amplification, to maintain the driving motor at the receiver in synchronism with the driving motor at the transmitter. When the facsimile signals are transmitted over ordinary telephone or telegraph lines, the characteristic of the telephone and telegraph plant equipment limit the amount of power that can be transmitted for synchronizing the tele-facsimile motors. Furthermore, when the tele-facsimile machines are designed for portability, the size of the driving motors is of considerable importance. Accordingly, it has been proposed heretofore to provide a tele-facsimile machine with two separate motors, one a power motor for bringing the mechanism from rest up to synchronous speed, and the other being a synchronous motor to maintain the synchronous speed. Heretofore however, the two functions have been electrically and mechanically separate. I have found that by employing a single composite motor structure, it is possible to design each section of the motor so that it performs its special function and reduces the cost and weight of the machine as a whole. Preferably the synchronizing section of the composite motor is of the toothed rotor or phonic-wheel type employing a specially designed toothed rotor. Where a greater efficiency is desired, a single rotor may be designed to act both as a phonic-wheel rotor and as the rotor of a power motor such as an induction type motor of the wound or squirrel-cage type.

Referring to Figs. 1 to 3, there is shown a composite motor of the general type described in detail in application Serial No. 299,955 to which reference may be had. In general, the motor comprises a motor casing 1, enclosing a power motor section including a field structure 2, armature 3, brushes 4, commutator 5 and armature shaft 6. The synchronous section of the motor consists of the stator poles 7, 8, with their windings 9, 10, which are arranged to be energized by the received synchronizing currents. The power section of the motor may be energized from the local commercial supply mains and brushes 4 are preferably swingably mounted on casing 1 and controlled by electromagnet 11 so that when the shaft 6 has been brought up to, or close to synchronous speed, the brushes can be released from the commutator 5 to reduce the frictional drag as described in said application Serial No. 299,955.

The shaft 6 supports the toothed-wheel rotor 12 which is coupled to the shaft by spring couplings 13, one end of each spring being fastened to a corresponding hook or eyelet 14 fastened to rotor 12 and the other end of each spring being fastened to a pin 15 fixed in collar 16 which is rigidly fastened to shaft 6. In other words, rotor 12 is capable of limited rotational displacement around shaft 6, the magnitude of which displacement depends upon the number and strength of the coupling springs 13. In accordance with the present invention, the rotor 12 is especially designed as shown in detail in Figs. 2 and 3. The rotor consists of a pile-up of annular iron laminations 17 which are clamped between the outer metal rings 18, 19, by means of the metal pins or rivets 20. The end plates 18 and 19 are then tightly fitted over a special bearing sleeve 21 preferably of a somewhat porous metal alloy such as bronze. As shown more clearly in Fig. 3, the laminations 17 are of greater internal diameter than the external diameter of sleeve 21, so as to leave an annular trough or space 22 which is packed with oiled felt or the like, to provide a continuous supply of lubricating oil to the bearing surface of sleeve 21.

The outer peripheral surface of rotor 12 is undercut to provide a plurality of teeth 23, which cooperate with the teeth or pole-pieces 7 of the stator to maintain the shaft 6 running at synchronous speed. It will be understood that once the shaft 6 has been brought to synchronous speed, the rotor 12 takes control and maintains the synchronous speed, and the brushes 4 are moved out of contact with commutator 5 to reduce the frictional load. Shaft 6 is coupled to the scanning drum of any suitable facsimile scanner by any suitable gear arrangement.

Instead of employing two separate rotors as in Fig. 1, the composite motor may be simplified and its efficiency increased by a special form of rotor and stator such as shown in Figs. 4 and 5. In this embodiment like that of Fig. 1, the composite rotor is provided with a lubricating bearing sleeve 26 similar to sleeve 21 (Fig. 3). The rotor is in general the same as that of Fig. 3 but is provided with radial notches 27 terminating in circular winding slots 28 to receive the armature windings 29. The slots 27 subdivide the toothed periphery of the rotor into a suitable number of poles which cooperate with the stator pole-pieces 30, 31, on which suitable field windings 32, 33, are wound. Preferably, the field structure is formed of a pile-up of laminations of the shape shown. Adjustably mounted on the motor casing 35 are field poles 36, which cooperate with the teeth 37. Thus each of the field poles 36 may be fastened to a bracket 46 by means of a screw 36a, the opposite end of each bracket 46 being provided with a threaded extension 46a which passes through a radial slot 46b in the casing 36. The bracket 46 is held in adjusted radial position by the nut 46c. This adjustment enables the air-gap between 36 and 37 to be closely regulated. Preferably, one or both of the poles 36 is pivotally mounted in its iron yoke 46, so that the said poles 36 can be adjusted circumferentially with respect to teeth 37 so as to be in proper radial relation therewith. The polarizing or exciting windings for the poles 36 are designated by the numeral 39.

In order to supply current to the armature windings 29, a novel form of commutator structure is employed. For this purpose the bearing sleeve 26 is provided with a series of transverse bores arranged in a circle around the center of the sleeve. Tightly fitted into each bore is a sleeve 40 of a suitable insulating material, and tightly fitted into each sleeve is a metal pin 41 which has its right-hand end flattened to provide a commutator segment 42, it being understood of course that there will be as many pins 41 and segments 42 as are required to take care of the armature winding sections. The left-hand end of each pin is connected to the corresponding armature winding as indicated in Fig. 5. Suitable brushes 43 are provided for engagement with the commutator and if desired these brushes may be mounted in brush carriers 44 which can be retracted by means of an electromagnet (not shown) when the rotor has attained synchronous speed. It will be understood of course that in this arrangement like that of Figs. 1 to 3, the rotor is coupled to the motor shaft 25 by means of spring couplings 13—16 so that the rotor is capable of limited rotational displacement with respect to the shaft 25. In this embodiment also, it will be noted that the annular space between the bearing sleeve 26 and the rotor laminations is provided with a packing 45 of oiled felt or the like. Preferably, although not necessarily, the phonic-wheel pole members 36, together with their windings and yoke 38, are carried by a bracket 46, which may be adjustably mounted in the motor casing 35 so as to adjust the said poles radially and circumferentially with respect to the teeth 37.

Figure 8:
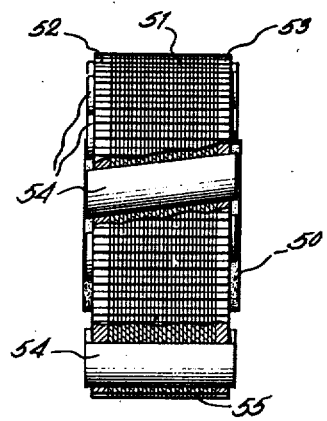
Fig. 8 is an end view of Fig. 7 with part of the rotor broken away to show the squirrel-cage bar arrangement.

Instead of having the brushes 43 mounted in end-on relation to the commutator segments 42, the ends of the commutator pins 41 may be bent so as to form circular arcs 46 as shown in Fig. 6 and Fig. 6A in which event the brushes 44 are mounted radially with respect to the commutator segments.

Where it is desired to operate the power section of the composite motor as an induction motor, the rotor may be designed in the form of a squirrel cage. Such an arrangement is shown in Figs. 7 and 8, in which the bearing sleeve 50 may be the same as the bearing sleeve 21 (Fig. 3). The annular laminations 51 are clamped between the copper or brass end plates 52, 53, the entire assembly being rigidly united by means of the squirrel-cage bars 54. The bars 54 are parallel to each other but inclined with respect to the rotational axis of the rotor. The bars 54 are of a metal of high electrical conductivity such as brass or the like and welded or otherwise electrically bonded to the end plates 52, 53. The entire peripherial surface of the rotor is then provided with a large number of teeth 55 corresponding to the teeth 23 (Fig. 2). The rotor of Figs. 7 and 8 may then be substituted for the rotor 12 of Figs. 1 or 4.

Figure 9:
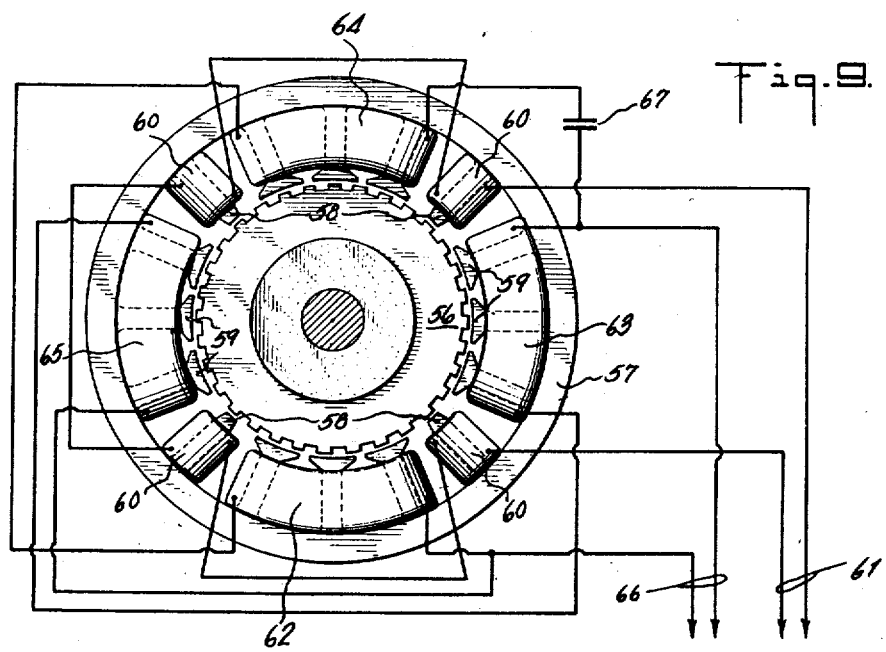
Fig. 9 shows a modified form of stator which may be used with the rotor of Fig. 1 or Fig. 7.

Referring to Fig. 9, there is shown a modified form of stator that may be used in the place of the stator of Fig. 1 or Fig. 4. In this embodiment the rotor 56 may be of the type shown in Fig. 1 or Fig. 7, having a toothed periphery as shown. The stator consists of a pile-up of circular iron laminations 57 having a plurality of pairs of integral inwardly projecting pole-pieces 58, corresponding to the poles 36 (Fig. 1). The laminations 57 are also provided with a plurality of sets of inwardly extending pole-pieces 59 corresponding to the pole-pieces 30—31 of Fig. 4. The poles 58 cooperate with the toothed projections on the rotor 56 to operate the said rotor as a phonic-wheel or synchronizing rotor while the poles 59 cooperate with the rotor 56 to operate it as an induction type rotor. For this purpose, each of the poles 58 is provided with a suitable winding 60, the windings being connected in series to the supply conductors 61 to which are applied the synchronizing signals, for example an 1800 cycle signal. The windings 62, 63, 64, 65, for the induction motor or power drive are connected in pairs across the power supply conductors 66 and in order to effect the necessary 90 degrees phase displacement, a condenser 67 is provided between the two sets of windings so that the induction motor motive power can be derived from a single phase A. C. source. It will be understood of course, that the sets of stator windings 62 to 65 can be energized from a two-phase supply in which event the condenser 67 can be deleted. With the arrangement of Fig. 9 therefore, the windings 62 to 65 cooperate with the rotor 56 to drive the motor shaft by induction motor operation, whereas the windings 60 cooperate with the toothed periphery of the rotor to drive the shaft as a phonic-wheel or synchronous motor. In this embodiment, the rotor is preferably connected to the motor shaft by spring couplings similar to the spring couplings 13 (Fig. 1).

In all the foregoing embodiments, the number of teeth on the rotor and the operating frequency are so chosen that the speed of the induction drive and the synchronous motor drive are substantially the same; if desired, the speed of the synchronous motor may be less than that of the induction motor drive.

While certain specific embodiments have been illustrated herein, various changes and modifications may be made without departing from the spirit and scope of the invention. Thus, while in Fig. 9, the windings 65 are each shown as spanning three poles 59, it will be understood that each winding 65 may span a greater or less number of poles as is well-known in the art.

What I claim is:

1. A rotor for a synchronous motor of the phonic-wheel type comprising a bearing sleeve of porous metal, a pile-up of annular laminations surrounding said sleeve, a supply of lubricating medium between the internal periphery of said pile-up and the external periphery of said sleeve, and end plates closely fitted on to said sleeve and between which said laminations are clamped, the outer periphery of said pile-up being provided with a plurality of teeth extending parallel to to the rotor axis.

2. A stator structure for a composite electric motor of the type having a single rotor arranged to be operated as an asynchronous rotor or as a phonic-wheel rotor, said stator comprising a pile-up of laminations having a plurality of integral inwardly extending radial polar projections, said projections being arranged in sets, one set acting as phonic-wheel stator poles and with each pole having an individual exciting winding thereon, the other set being arranged in groups and with a common winding for each group, and means to adjust the angular position of said phonic-wheel stator poles.

3. A composite electric motor comprising a single rotor arranged to be driven either as a synchronous rotor or as an asynchronous rotor, said rotor having a toothed periphery and carrying armature windings, separate stators cooperating respectively with said toothed periphery and with said armature windings at least one of said stators having means to adjust its angular position with respect to the rotor, said rotor being constructed of a laminated pile-up rigidly fastened on a bearing sleeve of porous metal, a supply of lubricating medium being provided between said sleeve and pile-up, and said rotor being connected to the motor shaft by at least one resilient coupling.

AUSTIN G. COOLEY.